(12) United States Patent
Salvo

(10) Patent No.: US 6,702,582 B1
(45) Date of Patent: Mar. 9, 2004

(54) DEVICE AND METHOD FOR SOLVING CIRCLES

(76) Inventor: Lynnea C. Salvo, 1801 Sheridan Ct., McLean, VA (US) 22101

( * ) Notice: Subject to any disclaimer, the term of this patent is extended or adjusted under 35 U.S.C. 154(b) by 0 days.

(21) Appl. No.: 10/290,228

(22) Filed: Nov. 8, 2002

Related U.S. Application Data
(60) Provisional application No. 60/331,094, filed on Nov. 8, 2001.

(51) Int. Cl.⁷ ............................ G09B 23/02; G09B 23/04
(52) U.S. Cl. ........................................ 434/214; 434/216
(58) Field of Search ..................... 446/188, 213, 446/214, 216, 206, 208, 211; 220/780, 796; 206/508, 509

(56) References Cited

U.S. PATENT DOCUMENTS

| | | | | |
|---|---|---|---|---|
| 270,225 A | * | 1/1883 | Kennedy | 434/213 |
| 538,261 A | * | 4/1895 | Kennedy | 434/213 |
| 600,610 A | * | 3/1898 | Cowles | 434/213 |
| 779,339 A | * | 1/1905 | Wulff | 220/276 |
| 2,854,789 A | * | 10/1958 | Berry | 446/219 |
| 3,229,386 A | * | 1/1966 | Schott | 434/216 |
| 3,604,615 A | * | 9/1971 | Barreman | 220/280 |
| 3,645,758 A | * | 2/1972 | MacManus | 220/786 |
| 5,302,148 A | * | 4/1994 | Heinz | 446/490 |
| 5,470,234 A | * | 11/1995 | Sher | 434/214 |

* cited by examiner

Primary Examiner—Derris H. Banks
Assistant Examiner—Urszula M Cegielnik
(74) Attorney, Agent, or Firm—Jacobson Holman PLLC

(57) ABSTRACT

A combination of devices that demonstrate visually and on an intuitive level mathematical principles relating to the circle including the number $\pi$, the relationship between circumference, diameter, radius and $\pi$, and the relationship between the area of a circle formed of circle sectors and an approximate parallelogram obtained by rearranging the circle sectors.

14 Claims, 3 Drawing Sheets

US 6,702,582 B1

DEVICE AND METHOD FOR SOLVING CIRCLES

This is a complete utility application entitled to the priority and claiming the benefit of U.S. provisional application Ser. No. 60/331,094 filed Nov. 8, 2001.

BACKGROUND OF THE INVENTION

1. Field of the Invention

The present invention is related to the field of mathematics and, more particularly, to a device for helping students visualize mathematical relationships relating to circles.

2. Description of the Related Art

Students of mathematics often have difficulty visualizing abstract terms and values, and their relationships. One such value, that of the number $\pi$, can be confusing when viewed apart from practical application. Therefore, a need exists for a way to help students better appreciate the interrelationships between n and the radius, diameter, circumference and area of a circle, by transforming an otherwise abstract numerical principle into a tangible reality.

SUMMARY OF THE INVENTION

Accordingly, it is an object of the present invention to visually demonstrate otherwise abstract mathematical relationships, particularly relating to circles.

Another object of the present invention is to demonstrate the number $\pi$ using a physical manipulative.

A further object of the present invention is to demonstrate with a tangible structure that the circumference of a circle consists of $\pi$ diameters.

Yet another object of the present invention is to physically demonstrate the area of a circle through the decomposition of the circle into a plurality of sectors which, when rearranged, approximate a parallelogram whose area is shown to be $\pi r^2$.

Yet a further object of the invention is an effective classroom teaching device for concepts relating to circles that is simple in construction so as to be convenient and inexpensive to use.

The present invention, which is referred to herein as the Circle Solver, includes a combination of devices that demonstrate visually and on an intuitive level at least three essential concepts about the circle. Firstly, these devices physically demonstrate the number $\pi$. Secondly, they visually demonstrate that the circumference (C) of a circle consists of $\pi$ times the circle diameter (d), or $\pi$ diameters of the circle, namely $C=\pi d$. Thirdly, these devices physically demonstrate the area of a circle through the decomposition of the circle into approximately a parallelogram whose area is shown to be $\pi$ times the radius (r) squared, or $\pi r^2$.

In a preferred embodiment, the Circle Solver includes as a first device a cylindrical container with a snug-fitting removable lid which can be used to demonstrate $\pi$ and circumference. Within the container is a second device that demonstrates a circle's area. This second device includes a plurality of circle sectors strung together on a string that, when assembled in one particular way, form exactly one complete circle and, when arranged in another way, approximate a parallelogram.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
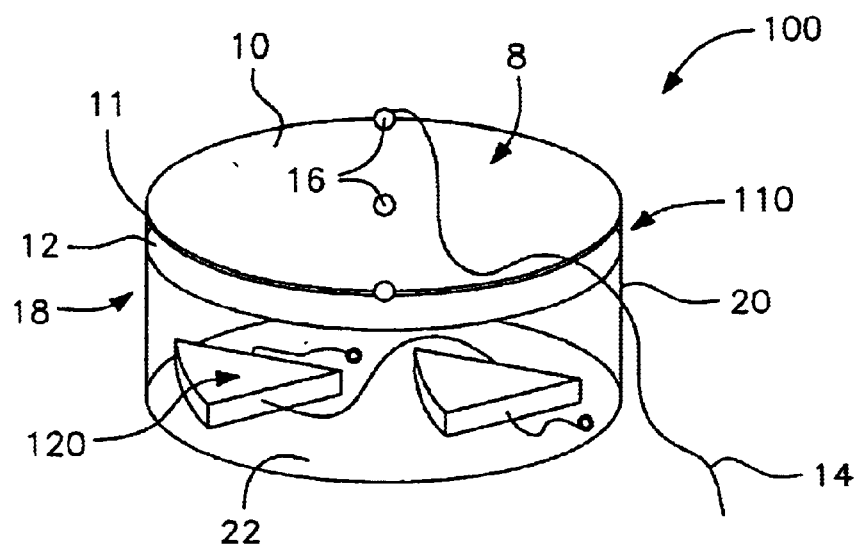
FIG. 1 is a perspective view of the cylindrical container of the first device, including a lid with three protrusions and a string, and a representative number of circle sectors on a string of the second device, in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, the Circle Solver, generally designated by the reference numeral 100, includes a first device embodied as a cylindrical container, generally designated by the reference numeral 110, and a second device, generally designated by the reference numeral 120. As shown, the second device 120 can conveniently be stored within the first device 110.

Figure 2A:
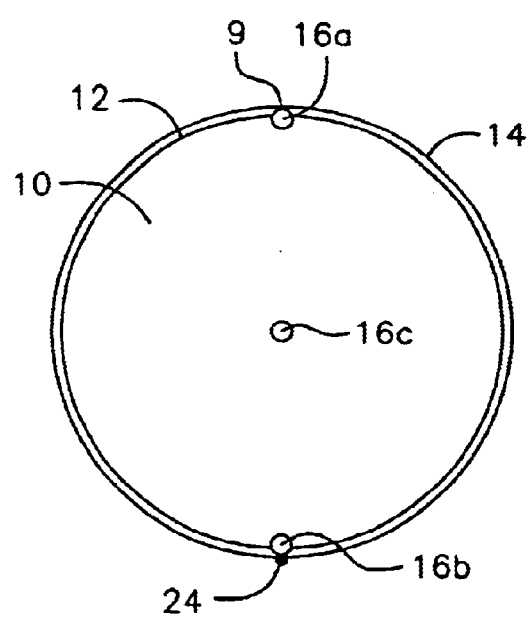
FIG. 2A is a top view of the first device of FIG. 1 showing the string wrapped around the circumference of the lid.

The cylindrical container 110 of the first device has a lid, generally designated by the reference numeral 8, with a circular upper surface 10 and a rim 12. The rim 12 may include a groove 11 or other partial indentation that extends along the circumference of the rim 12. Affixed to a point 9 on the circumference of the lid is a non-stretchable cord or string 14 of a length precisely equal to the circumference of the circular upper surface 10 as measured around the rim 12. To demonstrate its equality to the circumference, the string 14 can be neatly wrapped around the rim 12. (If the rim includes the groove 11, the string is preferably wrapped within this groove to assist the student in proper and secure placement of the string.) As shown in FIG. 2A, the string 14 includes a marker 24 at its midpoint and, when wrapped around the rim one time, the string 14 ends precisely at the point 9 where it started.

Alternatively, the string may be longer than one circumference provided it includes markings thereon indicating the length of one circumference. The string could also be provided with markings, which may be color coded, indicating a radius length and/or a diameter length for further visual clarification.

In addition to the attached string 14, there are three protrusions 16, such as pinheads or other projections, affixed to the lid 8. One protrusion 16a emanates from the point 9 at which the string 14 is attached to the lid 8, and a second protrusion 16b protrudes exactly on the opposite end of a diameter across the upper surface 10. The third protrusion 16c emanates exactly from the center of the upper surface 10 of the lid 8.

Figure 2B:
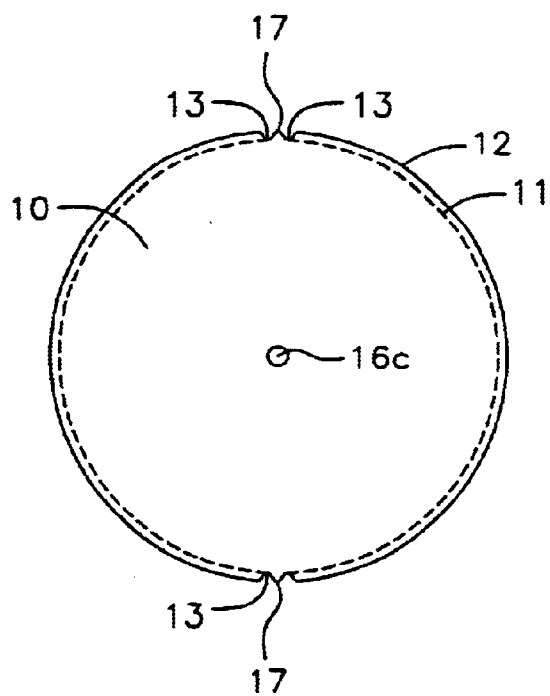
FIG. 2B is a top view of an alternative embodiment of the first device according to the present invention, shown without the string.

In the embodiment including the groove 11, as shown in top view without the string in FIG. 2B, additional grooves 13 may be provided in the upper surface 10 of the lid 8 to guide the string from the rim groove 11 to the upper surface 10 for demonstrations using the protrusions. The first and second protrusions 16a, 16b may be embodied as a central tongue 17 situated between two adjacent grooves 13 as shown. The grooves 13 guide the string therethrough, while the tongue 17 provides a structure around which the string may be wrapped in a manner similar to that effected by the upwardly extending protrusions 16a, 16b.

The body of the container 110, generally designated by the reference numeral 18, has a cylindrical wall 20 to which the lid 8 is fitted, and a bottom portion 22 substantially parallel with said lid and substantially equal in size thereto. In a preferred embodiment, the body 18 is constructed so that the height of the cylindrical wall 20 is equal to one-half of the radius of the upper surface 10 of the lid 8.

The container 110 may be constructed of wood, plastic, metal, or any other suitable material, as would be known for containers as disclosed herein. Plastic embodiments may be transparent as shown in FIG. 1, or may be translucent or opaque, and may include markings of various types. The projections 16 may be pins, tacks, screws, bolts, nails, hooks or any other structure (such as tongues 17) adequate for forming a projection around which the string may be looped and unlooped, as will now be described.

Figure 3:
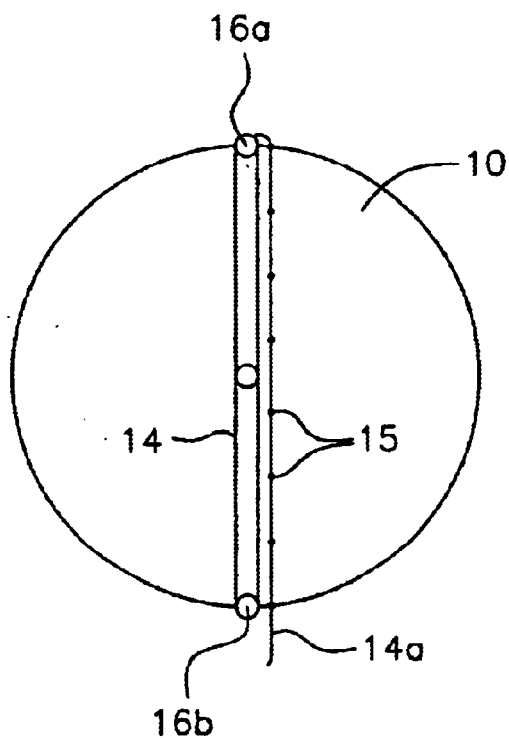
FIG. 3 is a top view of the string wrapped around the protrusions on the lid of the first device of FIG. 1.

To demonstrate the number π visually, as shown in FIG. 3, the string 14 of a length equal to the circumference of the lid 8 is looped neatly and snuggly around the protrusions 16 that mark the diameter until the string ends. The string spans three full diameters with a short tail 14a extending beyond. (The tail spans approximately 1/7 of another diameter.) The three diameters spanned by the string correspond to the whole number part, 3, of either the decimal or mixed number approximation of π, respectively, 3.14159 . . . or 3 1/7 (more commonly written as 22/7, which, incidentally, conceals π's proximity to the number 3 for those students not conversant with creating mixed numbers from improper fractions). The tail 14a corresponds to the decimal or fractional portion of the number, 3.14159 . . . or 3 1/7, respectively. While the decimal approximation of π is unending (and also never repeating), π itself is clearly and unequivocally seen to end.

For the purpose of demonstrating the number π visually and intuitively to young children, it is typically sufficient to say that π is "three and a little bit more" (to acknowledge the tail). With this demonstration, π has a physical appearance and is a tangible reality, rather than a magical but meaningless number.

To provide further visual clarification, the tail portion of the string may be marked so that, once the string is wrapped around three full diameters, the length of the tail portion corresponds with the marking. Alternatively, a diameter portion of the string, or the entire string, may be marked off into segments, each segment having a length of approximately 1/7 of the diameter of the upper surface of the lid. In this way, each diameter may be seen to correspond to approximately seven segments, with the tail being the one "extra" 1/7. The segments may be marked off with markers 15, as shown in FIG. 3, where only one diameter length of the string is shown to be marked. The divisions may also be indicated by lines or stripes spaced at the proper increments, or each 1/7th diameter length could be a different color, or made to be of alternating colors with adjoining 1/7th diameter lengths, etc.

Multiple strings with different marking schemes, lengths, etc., may be included with the container 110 and used interchangeably as desired. The strings may be removably attached to the lid using a variety of means as would be known by persons of skill in the art. For example, the attaching end of the string could have a small loop that is placed over a raised portion on the rim such that the string may be easily removed and replaced with another string similarly equipped with a loop but having other markings, length, etc. for additional demonstrations.

This device is meant to bring the number π home simply and physically in an introductory way. Once students have literally seen the approximate value of π, the painstaking measurements and calculations that are necessary to pinpoint π as a transcendental number of infinite decimal digits may be justified in later grades and can make sense.

Once π has been visualized, the circumference is literally and physically seen to be made of π diameters, thus the formula:

$$C=\pi d$$

The demonstration of area is a bit more complicated and entails a visual representation of the length of half a circumference. For this purpose, the string 14 is marked clearly at its midpoint with the marker 24 which may, for example, be a dot of a bright color, so that the half-length of the string is precisely half of the circumference. If the string length is greater than one circumference, the string is conspicuously marked at the appropriate distances to identify at least the circumference and a distance equal to half of the circumference.

Figure 4:
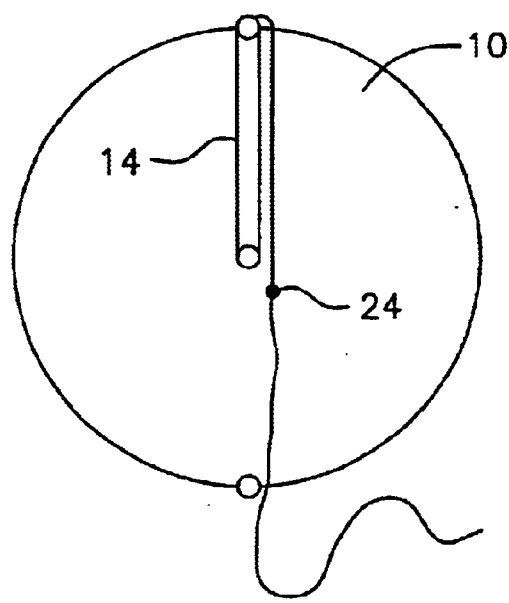
FIG. 4 is a top view illustrating a string having a midpoint marking, wrapped around the protrusions on the lid of the first device of FIG. 1.

This demonstration on the first device 110 is utilized in finding the formula for the area of the circle as accomplished using the second device 120. As shown in FIG. 4, the string is repeatedly looped neatly and snuggly from its point of origin on the circumference adjacent pin 16a to the pin 16c at the center of the lid 10 and back until it runs out. Once again, the number π visually appears, and it can be literally seen that half of the circumference is made of π times the radius or π radii. Since half of the circumference is πr, then the full circumference is twice that, or C=2πr, an alternative formula for the circumference.

Figure 5:
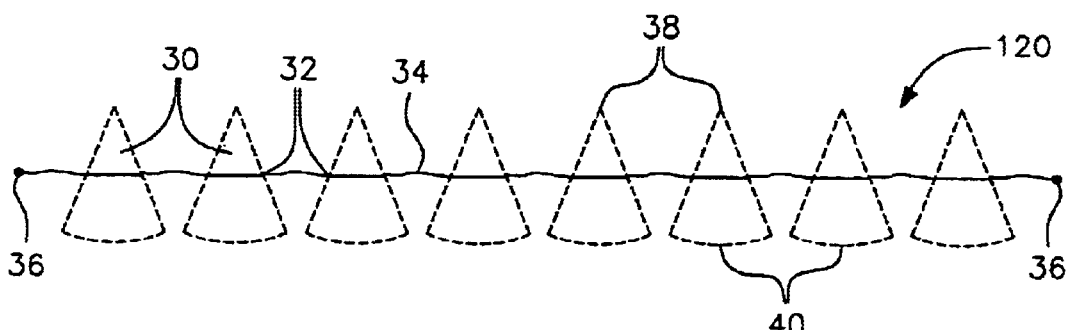
FIG. 5 is a top view of a plurality of circle sectors, each arranged in the same direction and extended on a string according to the second device of FIG. 1.

The second device 120 in the set demonstrates the area of a circle as decomposed into a parallelogram, and illuminates the formula for the circle's area. As shown in FIG. 5, the second device 120 includes a plurality of pie-shaped circle sectors 30 with the same radius of curvature and some thickness so as to be three-dimensional. When assembled in one way these sectors form exactly one complete circle, and when assembled in another way, they form an approximate parallelogram.

Preferably, the circle sectors are substantially equal in size, resulting in the nearest formation of a parallelogram, but circle sectors of different sizes may also be used. One particular alternative would be to have six sectors, each having an arc length of one radian, and a seventh sector having an arc length of approximately 0.28 radians, with a radian corresponding to the radius when curved as part of the circumference.

For purposes of demonstration, the device 120 consists of eight pie-shaped circle sectors 30 but this number is for the purpose of example only, as a greater or fewer number of sectors may also be used.

The circle sectors may be made of wood, plastic, metal or any other suitable material for the purposes disclosed herein. The sectors are strung together on a cord or string 34 that passes through them laterally at the midpoints 32 of their radii, as best seen in FIG. 1. In other words, if the pie-shape of each sector is defined by upper and lower surfaces that are substantially parallel with one another, with the upper and lower surfaces joined by an arc-shaped end surface and two side surfaces, each side surface having a length (as measured from the arc-shaped end surface to the point at which the side surfaces intersect with one another) corresponding to the radius, the string 34 passes through a channel formed substantially parallel with the upper and lower surfaces between openings positioned midway along the radius length of the side surfaces of the pie-shaped sectors. The holes in the radii midpoints may be drilled, molded or otherwise formed in any way suitable to the material from which the sectors are constructed. The sectors may be made of different colors should this prove helpful. The string 34 has an enlargement such as a knot 36 at each end so that the sectors 30 cannot slide off the string 34.

Figure 6:
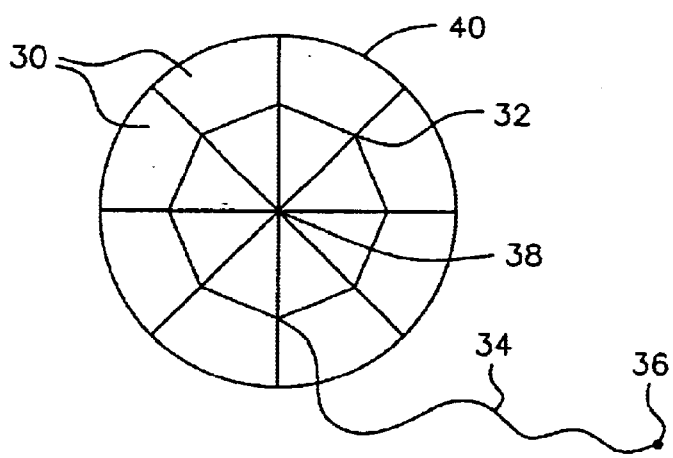
FIG. 6 is a top view of the plurality of circle sectors shown in FIG. 5, with the string having been pulled taut to form a circle.

Two alternate demonstrations can be performed by simple manipulations. For the first demonstration, the sectors 30 are all arranged on the string 34 so that their pointed ends 38 face in the same direction, as shown in FIG. 5. When the string 34 is pulled taut, the sectors assemble into a circle as shown in FIG. 6. Thus the total area of the sectors 30, regardless of how else they might be arranged (provided there is no overlapping), will be the same as the area of the circle.

Figure 7:
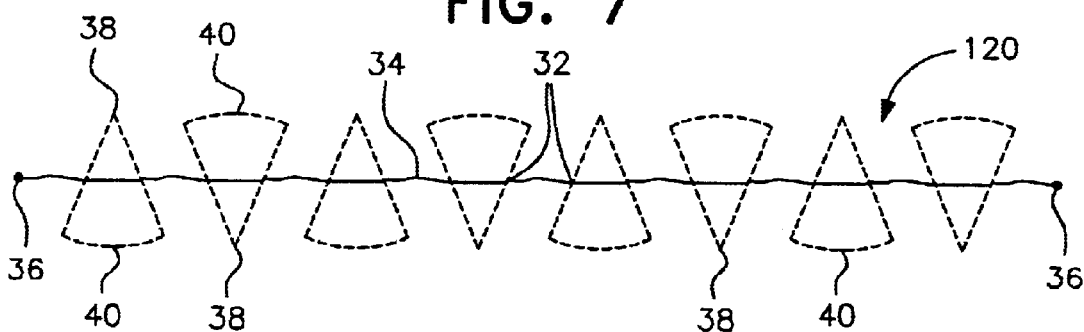
FIG. 7 is a top view of a plurality of circle sectors arranged in alternating directions and extended on a string according to the second device of FIG. 1.
Figure 8:
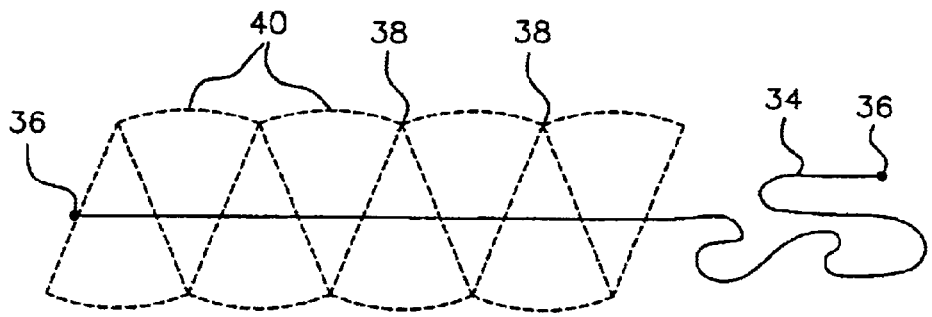
FIG. 8 is a top view of the plurality of circle sectors shown in FIG. 7, with the string having been pulled taut to approximate a parallelogram.

For the second demonstration, the sectors 30 are stretched back out along the string 34 and arranged so that the points 38 alternately face in opposite directions, as shown in FIG. 7. Once again, the string is pulled taut but this time the sectors assemble into approximately a parallelogram, as shown in FIG. 8. The parallelogram is approximate because the sectors 30, having edges 40 that are actually arcs of a circle, cannot form into the straight sides that a parallelogram actually has. Nevertheless, the shape is parallelogram-like.

Provided that students know that the formula for the area (A) of a parallelogram is base (b) times height (h), namely, A=bh, the formula for the area of the circle can now be derived from this physical representation. The length or base (b) of the parallelogram consists of the arcs 40 that comprise half the circle, thus half of the circumference, which was demonstrated with the first device 110 to be π radii, or πr, so b=πr. The height (h) of the parallelogram runs from the arc 40 that is part of the circumference of the sector to the sector's point 38 which, when the circle of FIG. 6 is assembled, is the center thereof. This distance is more simply known as the radius, r, so the height of the parallelogram is r. As the area is the product of the base and height, $A=bh=(\pi r)(r)=\pi rr=\pi r^2$.

Thus, we have the formula for the area of a circle:

$A=\pi r^2$

In this second demonstration, sectors of alternating colors such as red and green may be helpful in communicating to the students the alternating directions of the points, e.g., the red sectors point in one direction and the green sectors point in the opposite direction. Furthermore, when the resulting parallelogram is assembled, each opposing base forming the length thereof will be comprised of one of the colors, emphasizing to the students that each of the bases formed has a length that is equal to half of the circumference of the circle formed with such sectors.

A further mathematical relationship may be demonstrated when, in accordance with a preferred embodiment, the height of the cylindrical wall 20 is one-half the radius of the upper surface 10 of the lid 8. With this construction, it may be shown that the area of the circle represented by the upper surface 10 of the lid is equal to the area of a rectangle obtained by "unwrapping" the cylindrical wall 20. In other words, were the cylindrical wall 20 to be covered with a label, as on a can of canned food, the label could be removed and smoothed out to lie flat, forming a rectangle. The length of such rectangle is equal to the circumference of the cylinder 18, or 2πr. If the height of the rectangle is one-half the radius (½ r) of the lid, the area of the label, or the "unwrapped" cylindrical wall, is the same as the area of the circular upper surface of the lid, $(½r)(2\pi r)=\pi r^2$ The relationship between the area of a circle and that of the rectangle formed from a decomposition of the circle sectors as explained in the second demonstration may be further emphasized if the size of the circle formed with the second device 120 is equal to that of the upper surface 10 of the lid 8. In this way, the "unwrapped" cylindrical wall will have the same area as the sectors of the device 120, whether such sectors are assembled into a parallelogram or a circle.

To emphasize for the students that the outcome of all of the above-described demonstrations remains the same regardless of the size of the circle, a set of Circle Solvers for several different-sized circles may be nested as an inexpensive and effective classroom teaching device. Through the use of Circle Solvers of different sizes, each physically demonstrating the same relationship between its respective string length and lid circumference, the universality of π as well as that of the formulas for circumference and area may be effectively illustrated.

As noted earlier, the cylindrical container may be provided with multiple strings having different marking schemes, lengths, etc., which may be used interchangeably as desired. This construction may be combined with additional features aimed at helping older students while retaining the functionalities already described. For example, the upper surface of the lid may be marked in both degrees and radians like a circular compass. One of the additional strings may have a length of 2π and be marked into 24 divisions so that, when the string is wrapped around the circumference of the lid, two divisions show an arc length of π/6, three divisions show an arc length of π/4, and four divisions show an arc length of π/3. Through such a physical representation of these multiples, visual conversion from radians to degrees and vice versa is facilitated.

The devices could also be programmed in a computer version as a virtual manipulative of the present invention.

The foregoing descriptions and drawings should be considered as illustrative only of the principles of the invention. The invention may be configured in a variety of sizes and all suitable modifications and equivalents may be resorted to, falling within the scope of the invention.

What is claimed is:

1. A device for visually demonstrating a characteristic of a circle, comprising:

a cylindrical container having a body and a lid fitted thereon with at least three projections, a first projection located at a point on a circumference of a circle defined by an upper surface of said lid, a second projection in a center of said circle, and a third projection on the circumference of said circle opposite said first projection and in linear alignment with said first and second projections across a diameter of said upper surface; and a string attached at one end to said lid adjacent said first projection and having a length at least equal to the circumference of said lid.

2. The device as set forth in claim 1, wherein an outer wall surface of said body is perpendicular to said upper surface, a height of said outer wall surface being exactly one half a radius of said circular upper surface.

3. The device as set forth in claim 1, wherein the length of said string is equal to said circumference and includes a marker at a point midway along said length thereof.

4. The device as set forth in claim 1, wherein the length of said string is greater than said circumference, said string including a marker at a point equal to said circumference.

5. The device as set forth in claim 1, wherein the length of said string is equal to said circumference and said string includes markings along said length that are evenly spaced from one another at a distance equal to $\frac{1}{7}$ of said diameter.

6. The device as set forth in claim 1, further comprising;

a plurality of three-dimensional circle sectors, each of said sectors having an equal radius; and a second string running through each of said plurality of circle sectors at a midpoint of said radii to connect said plurality of circle sectors rotatably along said second string.

7. The device as set forth in claim 6, said second string having an enlargement at each end thereof such that said plurality of circle sectors cannot slide off said second string.

8. The device as set forth in claim 7, wherein said plurality of circle sectors and said second string fit within said cylindrical container.

9. The device as set forth in claim 6, wherein said plurality of circle sectors, when center points thereof are in alignment, form a circle when said second string is pulled taut to place said sectors next to one another along radii thereof.

10. The device as set forth in claim 6, wherein said plurality of circle sectors, when center points thereof are alternating, form an approximate parallelogram when said second string is pulled taut to place said sectors next to one another along radii thereof.

11. A device for visually demonstrating a characteristic of a circle, comprising:

a cylindrical element having an upper surface defining a circle and a rim extending perpendicularly therefrom, at least three projections extending from said upper surface, a first projection located at a point on a circumference of said circle, a second projection in a center of said circle, and a third projection on the circumference of said circle opposite said first projection and in linear alignment with said first and second projections; and a string attached at one end to said rim adjacent said first projection and having a length equal to the circumference of said lid such that said string wraps around said rim exactly one time.

12. The device as set forth in claim 11, wherein said string includes a marker at a point midway along said length thereof.

13. The device as set forth in claim 11, wherein said rim includes a groove around a circumference thereof, and said first and third projections extend outwardly from said upper surface, each having a groove on either side thereof for guiding of said string from said rim groove to said upper surface.

14. The device as set forth in claim 11, wherein each of said first, second and third projections extend upwardly from said upper surface.

* * * * *